(12) United States Patent
Seeger

(10) Patent No.: US 8,020,441 B2
(45) Date of Patent: Sep. 20, 2011

(54) DUAL MODE SENSING FOR VIBRATORY GYROSCOPE

(75) Inventor: Joseph Seeger, Menlo Park, CA (US)

(73) Assignee: Invensense, Inc., Sunnyvale, CA (US)

( * ) Notice: Subject to any disclaimer, the term of this patent is extended or adjusted under 35 U.S.C. 154(b) by 514 days.

(21) Appl. No.: 12/026,490

(22) Filed: Feb. 5, 2008

(65) Prior Publication Data

US 2009/0193892 A1 Aug. 6, 2009

(51) Int. Cl.
*G01P 9/04* (2006.01)
*G01C 19/56* (2006.01)

(52) U.S. Cl. ............... 73/504.12; 73/504.14; 73/504.04

(58) Field of Classification Search ............... 73/504.12, 73/504.14, 504.15, 504.02, 504.04
See application file for complete search history.

(56) References Cited

U.S. PATENT DOCUMENTS

| | | |
|---|---|---|
| 4,510,802 A | 4/1985 | Peters |
| 4,601,206 A | 7/1986 | Watson |
| 4,736,629 A | 4/1988 | Cole |
| 4,783,742 A | 11/1988 | Peters |
| 4,841,773 A | 6/1989 | Stewart |
| 5,251,484 A | 10/1993 | Mastache |
| 5,349,858 A | 9/1994 | Yagi et al. |
| 5,359,893 A | 11/1994 | Dunn |
| 5,367,631 A | 11/1994 | Levy |
| 5,415,040 A | 5/1995 | Nottmeyer |
| 5,433,110 A | 7/1995 | Gertz et al. |
| 5,440,326 A | 8/1995 | Quinn |
| 5,444,639 A | 8/1995 | White |
| 5,511,419 A | 4/1996 | Dunn |
| 5,541,860 A | 7/1996 | Takei et al. |
| 5,574,221 A | 11/1996 | Park et al. |
| 5,629,988 A | 5/1997 | Burt et al. |
| 5,635,638 A | 6/1997 | Geen |
| 5,698,784 A | 12/1997 | Hotelling |
| 5,703,293 A | 12/1997 | Zabler et al. |
| 5,703,623 A | 12/1997 | Hall et al. |
| 5,734,373 A | 3/1998 | Rosenberg et al. |
| 5,780,740 A | 7/1998 | Lee et al. |
| 5,825,350 A | 10/1998 | Case, Jr. |

(Continued)

FOREIGN PATENT DOCUMENTS

EP 0429391 8/1995

OTHER PUBLICATIONS

Oboe, R., Lasalandra, E., White, M. M. MEMS-based Accelerometers and their Application to Vibration Suppression in Hard Disk Drives. MEMS/NEMS Handbook Techniques and Applications vol. 4, Springer 2006, pp. 1-29 see pp. 7-22.

(Continued)

*Primary Examiner* — Helen C. Kwok
(74) *Attorney, Agent, or Firm* — Sawyer Law Group, P.C.

(57) ABSTRACT

An angular rate sensor is disclosed. The angular rate sensor comprises a substrate and a drive subsystem partially supported by a substrate. The drive subsystem includes at least one spring, at least one anchor, and at least one mass; the at least one mass of the drive subsystem is oscillated by at least one actuator along a first axis. Coriolis force acts on moving the drive subsystem along or around a second axis in response to angular velocity of the substrate around the third axis. The angular rate sensor also includes a sense subsystem partially supported by a substrate. The sense subsystem includes at least one spring, at least one anchor, and at least one mass.

7 Claims, 8 Drawing Sheets

U.S. PATENT DOCUMENTS

| | | | |
|---|---|---|---|
| 5,895,850 A | 4/1999 | Buestgens | |
| 5,898,421 A | 4/1999 | Quinn | |
| 5,955,668 A * | 9/1999 | Hsu et al. | 73/504.12 |
| 5,992,233 A | 11/1999 | Clark | |
| 5,996,409 A | 12/1999 | Funk et al. | |
| 6,067,858 A | 5/2000 | Clark et al. | |
| 6,122,961 A | 9/2000 | Geen et al. | |
| 6,134,961 A | 10/2000 | Touge et al. | |
| 6,158,280 A | 12/2000 | Nonomura | |
| 6,168,965 B1 | 1/2001 | Malinovich et al. | |
| 6,189,381 B1 * | 2/2001 | Huang et al. | 73/504.12 |
| 6,230,564 B1 | 5/2001 | Matsunaga et al. | |
| 6,250,156 B1 | 6/2001 | Seshia et al. | |
| 6,250,157 B1 | 6/2001 | Touge | |
| 6,269,254 B1 | 7/2001 | Mathis | |
| 6,279,043 B1 | 8/2001 | Hayward et al. | |
| 6,292,170 B1 | 9/2001 | Chang et al. | |
| 6,343,349 B1 | 1/2002 | Braun et al. | |
| 6,370,937 B2 * | 4/2002 | Hsu | 73/1.37 |
| 6,374,255 B1 | 4/2002 | Peurach et al. | |
| 6,386,033 B1 | 5/2002 | Negoro | |
| 6,391,673 B1 | 5/2002 | Ha et al. | |
| 6,393,914 B1 | 5/2002 | Zarabadi et al. | |
| 6,424,356 B2 | 7/2002 | Chang et al. | |
| 6,429,895 B1 | 8/2002 | Onuki | |
| 6,430,998 B2 | 8/2002 | Kawai et al. | |
| 6,480,320 B2 | 11/2002 | Nasiri | |
| 6,481,283 B1 | 11/2002 | Cardarelli | |
| 6,481,284 B2 | 11/2002 | Geen et al. | |
| 6,481,285 B1 | 11/2002 | Shkel et al. | |
| 6,487,369 B1 | 11/2002 | Sato | |
| 6,487,908 B2 | 12/2002 | Geen et al. | |
| 6,494,096 B2 | 12/2002 | Sakai et al. | |
| 6,508,122 B1 | 1/2003 | McCall et al. | |
| 6,508,125 B2 | 1/2003 | Otani | |
| 6,513,380 B2 | 2/2003 | Reeds, III et al. | |
| 6,520,017 B1 | 2/2003 | Schoefthaler et al. | |
| 6,533,947 B2 | 3/2003 | Nasiri et al. | |
| 6,573,883 B1 | 6/2003 | Bartlett | |
| 6,636,521 B1 | 10/2003 | Guillianelli | |
| 6,646,289 B1 | 11/2003 | Badehi | |
| 6,668,614 B2 | 12/2003 | Itakura | |
| 6,720,994 B1 | 4/2004 | Grottodden et al. | |
| 6,725,719 B2 | 4/2004 | Cardarelli | |
| 6,758,093 B2 | 7/2004 | Tang et al. | |
| 6,794,272 B2 | 9/2004 | Turner et al. | |
| 6,796,178 B2 | 9/2004 | Jeong et al. | |
| 6,823,733 B2 | 11/2004 | Ichinose | |
| 6,834,249 B2 | 12/2004 | Orchard | |
| 6,845,669 B2 | 1/2005 | Acar et al. | |
| 6,848,304 B2 | 2/2005 | Geen | |
| 6,859,751 B2 | 2/2005 | Cardarelli | |
| 6,860,150 B2 | 3/2005 | Cho | |
| 6,892,575 B2 | 5/2005 | Nasiri et al. | |
| 6,915,693 B2 | 7/2005 | Kim et al. | |
| 6,918,297 B2 | 7/2005 | MacGugan | |
| 6,918,298 B2 * | 7/2005 | Park | 73/504.16 |
| 6,938,484 B2 | 9/2005 | Najafi et al. | |
| 6,939,473 B2 * | 9/2005 | Nasiri et al. | 216/2 |
| 6,952,965 B2 | 10/2005 | Kang et al. | |
| 6,955,086 B2 | 10/2005 | Yoshikawa et al. | |
| 6,963,345 B2 | 11/2005 | Boyd et al. | |
| 6,972,480 B2 | 12/2005 | Zilber et al. | |
| 6,981,416 B2 | 1/2006 | Chen et al. | |
| 7,004,025 B2 | 2/2006 | Tamura | |
| 7,028,546 B2 | 4/2006 | Hoshal | |
| 7,028,547 B2 | 4/2006 | Shiratori et al. | |
| 7,036,372 B2 * | 5/2006 | Chojnacki et al. | 73/504.12 |
| 7,040,163 B2 | 5/2006 | Shcheglov et al. | |
| 7,040,922 B2 | 5/2006 | Harney et al. | |
| 7,057,645 B1 | 6/2006 | Hara et al. | |
| 7,077,007 B2 | 7/2006 | Rich et al. | |
| 7,104,129 B2 | 9/2006 | Nasiri et al. | |
| 7,121,141 B2 | 10/2006 | McNeil | |
| 7,154,477 B1 | 12/2006 | Hotelling et al. | |
| 7,155,975 B2 | 1/2007 | Mitani et al. | |
| 7,158,118 B2 | 1/2007 | Liberty | |
| 7,159,442 B1 | 1/2007 | Jean | |
| 7,168,317 B2 | 1/2007 | Chen | |
| 7,180,500 B2 | 2/2007 | Marvit et al. | |
| 7,196,404 B2 | 3/2007 | Schirmer et al. | |
| 7,210,351 B2 | 5/2007 | Lo et al. | |
| 7,222,533 B2 * | 5/2007 | Mao et al. | 73/504.04 |
| 7,236,156 B2 | 6/2007 | Liberty et al. | |
| 7,237,437 B1 | 7/2007 | Fedora | |
| 7,239,301 B2 | 7/2007 | Liberty et al. | |
| 7,240,552 B2 | 7/2007 | Acar et al. | |
| 7,243,561 B2 | 7/2007 | Ishigami et al. | |
| 7,247,246 B2 | 7/2007 | Nasiri et al. | |
| 7,250,112 B2 | 7/2007 | Nasiri et al. | |
| 7,258,008 B2 | 8/2007 | Durante et al. | |
| 7,258,011 B2 | 8/2007 | Nasiri et al. | |
| 7,260,789 B2 | 8/2007 | Hunleth et al. | |
| 7,262,760 B2 | 8/2007 | Liberty | |
| 7,284,430 B2 * | 10/2007 | Acar et al. | 73/504.12 |
| 7,289,898 B2 | 10/2007 | Hong et al. | |
| 7,290,435 B2 * | 11/2007 | Seeger et al. | 73/1.37 |
| 7,299,695 B2 | 11/2007 | Tanaka et al. | |
| 7,325,454 B2 | 2/2008 | Saito et al. | |
| 7,331,212 B2 | 2/2008 | Manlove et al. | |
| 7,333,087 B2 | 2/2008 | Soh et al. | |
| 7,352,567 B2 | 4/2008 | Hotelling et al. | |
| 7,377,167 B2 * | 5/2008 | Acar et al. | 73/504.14 |
| 7,386,806 B2 | 6/2008 | Wroblewski | |
| 7,395,181 B2 | 7/2008 | Foxlin | |
| 7,414,611 B2 | 8/2008 | Liberty | |
| 7,424,213 B2 | 9/2008 | Imada | |
| 7,437,931 B2 | 10/2008 | Dwyer et al. | |
| 7,442,570 B2 | 10/2008 | Nasiri et al. | |
| 7,454,971 B2 | 11/2008 | Blomqvist | |
| 7,458,263 B2 | 12/2008 | Nasiri et al. | |
| 7,508,384 B2 | 3/2009 | Zhang et al. | |
| 7,522,947 B2 | 4/2009 | Tsuda | |
| 7,533,569 B2 | 5/2009 | Sheynblat | |
| 7,549,335 B2 | 6/2009 | Inoue et al. | |
| 7,552,636 B2 | 6/2009 | Datskos | |
| 7,617,728 B2 | 11/2009 | Cardarelli | |
| 7,621,183 B2 | 11/2009 | Seeger et al. | |
| 7,677,099 B2 * | 3/2010 | Nasiri et al. | 73/504.12 |
| 7,677,100 B2 | 3/2010 | Konaka | |
| 7,765,869 B2 | 8/2010 | Sung et al. | |
| 7,779,689 B2 | 8/2010 | Li et al. | |
| 7,783,392 B2 | 8/2010 | Oikawa | |
| 7,784,344 B2 | 8/2010 | Pavelescu et al. | |
| 2002/0027296 A1 | 3/2002 | Badehi | |
| 2002/0189351 A1 * | 12/2002 | Reeds et al. | 73/504.04 |
| 2003/0159511 A1 | 8/2003 | Zarabadi et al. | |
| 2004/0016995 A1 | 1/2004 | Kuo et al. | |
| 2004/0066981 A1 | 4/2004 | Li et al. | |
| 2004/0160525 A1 | 8/2004 | Kingetsu et al. | |
| 2004/0179108 A1 | 9/2004 | Sorek et al. | |
| 2005/0066728 A1 | 3/2005 | Chojnacki et al. | |
| 2005/0110778 A1 | 5/2005 | Ben Ayed | |
| 2005/0199061 A1 | 9/2005 | Acar et al. | |
| 2005/0212751 A1 | 9/2005 | Marvit et al. | |
| 2006/0017837 A1 | 1/2006 | Sorek et al. | |
| 2006/0032308 A1 | 2/2006 | Acar et al. | |
| 2006/0033823 A1 | 2/2006 | Okamura | |
| 2006/0061545 A1 | 3/2006 | Hughes et al. | |
| 2006/0115297 A1 | 6/2006 | Nakamaru | |
| 2006/0119710 A1 | 6/2006 | Ben-Ezra et al. | |
| 2006/0139327 A1 | 6/2006 | Dawson et al. | |
| 2006/0164382 A1 | 7/2006 | Kulas et al. | |
| 2006/0164385 A1 | 7/2006 | Smith et al. | |
| 2006/0185502 A1 | 8/2006 | Nishitani et al. | |
| 2006/0187308 A1 | 8/2006 | Lim et al. | |
| 2006/0251410 A1 | 11/2006 | Trutna, Jr. | |
| 2007/0035630 A1 | 2/2007 | Lindenstruth et al. | |
| 2007/0063985 A1 | 3/2007 | Yamazaki et al. | |
| 2007/0113207 A1 | 5/2007 | Gritton | |
| 2007/0146325 A1 | 6/2007 | Poston et al. | |
| 2007/0167199 A1 | 7/2007 | Kang | |
| 2007/0176898 A1 | 8/2007 | Suh | |
| 2008/0009348 A1 | 1/2008 | Zaleweski et al. | |
| 2008/0088602 A1 | 4/2008 | Hotelling | |
| 2008/0098315 A1 | 4/2008 | Chou et al. | |
| 2008/0134784 A1 | 6/2008 | Jeng et al. | |

| | | |
|---|---|---|
| 2008/0158154 A1 | 7/2008 | Liberty et al. |
| 2008/0204566 A1 | 8/2008 | Yamazaki et al. |
| 2008/0314147 A1 | 12/2008 | Nasiri et al. |
| 2009/0005975 A1 | 1/2009 | Forstall et al. |
| 2009/0005986 A1 | 1/2009 | Soehren |
| 2009/0043504 A1 | 2/2009 | Bandyopadhyay et al. |
| 2009/0088204 A1 | 4/2009 | Culbert et al. |
| 2009/0326851 A1 | 12/2009 | Tanenhaus |
| 2010/0013814 A1 | 1/2010 | Jarczyk |

OTHER PUBLICATIONS

Singh, Amit, "The Apple Motion Sensor as a Human Interface Device," www.kernelthread.com, 1994-2006.

Cho, et al., Dynamics of Tilt-based Browsing on Mobile Devices. CHI 2007, Apr. 28-May 3, 2007, San Jose, California, USA., pp. 1947-1952.

* cited by examiner

DUAL MODE SENSING FOR VIBRATORY GYROSCOPE

FIELD OF THE INVENTION

The present invention relates to a vibratory gyroscope and more particularly to a drive and sense subsystems formed within such a gyroscope.

BACKGROUND OF THE INVENTION

In vibratory gyroscopes with two sense peak structures, conventional designs require sense masses to be split in order to achieve two mode dynamics [Acar et al., U.S. Pat. No. 6,845,669]. Additionally, in conventional systems in the two sense peak design, the sense masses are never anchored [Acar et al., U.S. Pat. No. 6,845,669]. Accordingly, a problem with conventional systems is that they may not be sensitive enough in some applications and may also produce a high amount of mechanical noise to adversely affect the sensing capability of the gyroscope.

Accordingly what is needed is a vibrating gyroscope and a system that overcomes these issues. The present invention addresses such a need.

SUMMARY OF THE INVENTION

An angular rate sensor is disclosed. The angular rate sensor comprises a substrate and a drive subsystem partially supported by a substrate. The drive subsystem includes at least one spring, at least one anchor, and at least one mass; the at least one mass of the drive subsystem is oscillated by at least one actuator along a first axis. The Coriolis force acts on the drive subsystem along or around a second axis in response to angular velocity of the substrate around the third axis. The angular rate sensor also includes a sense subsystem partially supported by a substrate. The sense subsystem includes at least one spring, at least one anchor, and at least one mass. The sense subsystem moves along or around the fourth axis; and the motion of the sense subsystem can be sensed by a transducer and is proportional to the rate of rotation of a substrate about a third axis. Finally, the angular rate sensor comprises a flexible coupling between the drive subsystem and the sense subsystem.

DETAILED DESCRIPTION OF PREFERRED EMBODIMENTS

The present invention relates generally to a drive and sense subsystems formed within a device layer, and a substrate. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

General Structure of the Angular Rate Sensor

Figure 1A:
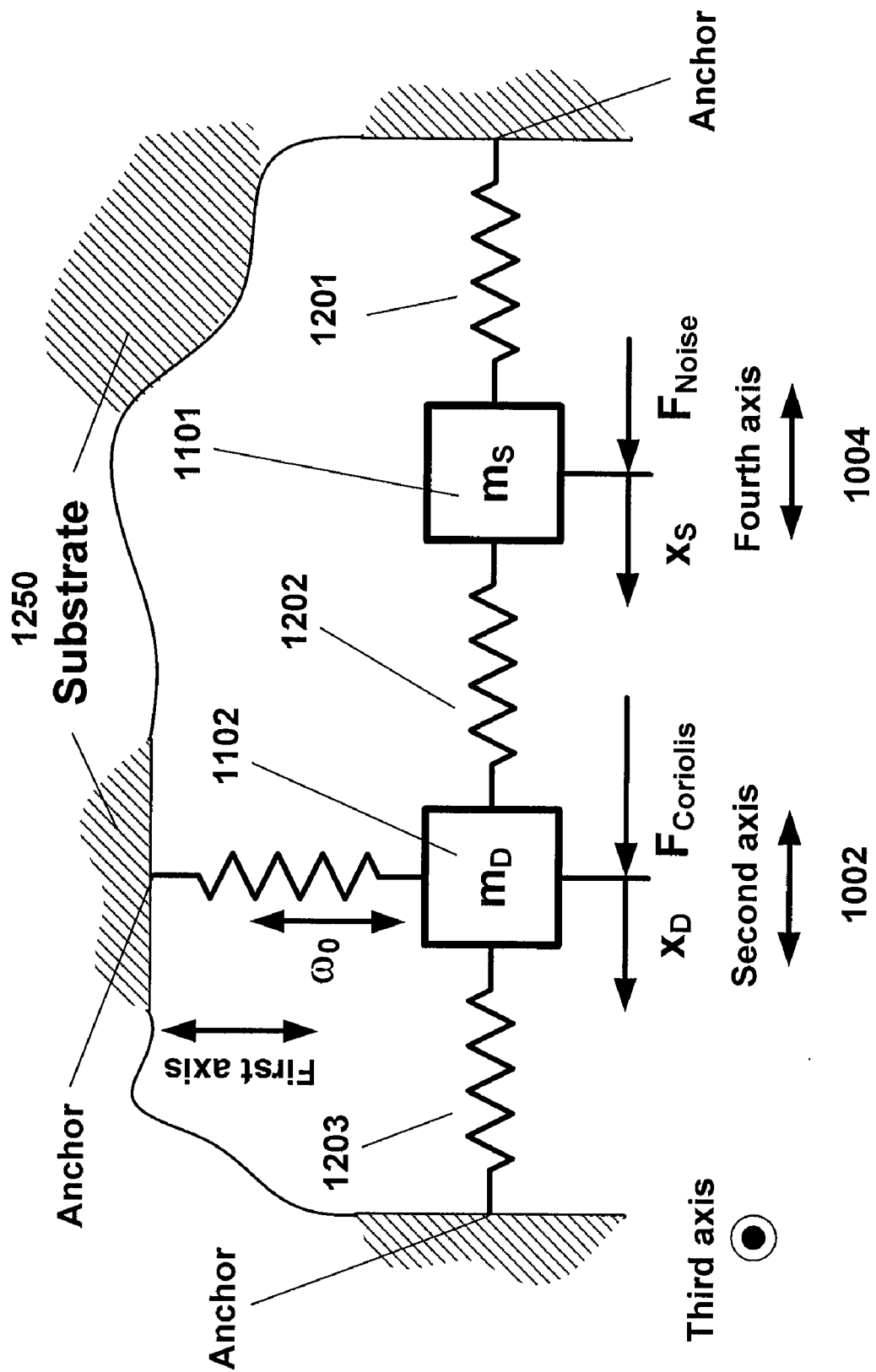
FIG. 1A shows the angular rate sensor comprising drive and sense subsystems, and a substrate.

Referring to the FIG. 1A, the angular rate sensor comprises drive and sense subsystems, and a substrate. The drive and sense subsystems 1002 and 1004 respectively are supported by the substrate 1250 through anchor points, and the drive and sense subsystems 1002 and 1004 are flexibly coupled. The drive subsystem 1002 may include mass 1102 which could be one or more separate masses and the sense subsystem 1004 may include mass 1101 which could be one or more separate masses. The drive subsystem 1002 may be oscillated at a frequency ω along a first axis by an actuator. Coriolis forces $F_{coriolis}$ may be generated on the drive subsystem 1002 along or around a second axis if the substrate 1250 rotates around a third axis. The Coriolis forces $F_{coriolis}$ may be transferred to the sense subsystem 1004 through the flexible coupling 1202 and cause the sense subsystem 1004 to move along or around the fourth axis. Motion of the sense subsystem 1004 may be sensed with an appropriate transducer, and its amplitude may be proportional to the rate of rotation of the substrate 1250. Further, another force, such as mechanical noise $F_{noise}$, may act on the sense subsystem 1004 thus interfering with sensing of the rate of rotation of the substrate 1250.

The following analysis describes how Coriolis force and noise are transferred from the drive 1002 to the sense subsystem 1004 and vice-versa. First, referring to FIG. 1B, the basic system, comprising drive mass 1102 and sense mass 1101, drive flexure 1203 and sense flexure 1201, and a flexible coupling 1202 between masses 1102 and 1101, is described. This basic system discloses all benefits of the sensing scheme, in particular, more efficient transfer of Coriolis forces to the sense motion and rejection of the mechanical noise $F_{noise}$ generated on the sense subsystem 1004. Further, the analysis continues to extend the sensing scheme to the case where drive and sense subsystems comprise a plurality of masses and springs. Further yet, two particular angular rate sensor embodiments applying the disclosed sensing scheme are addressed. The first embodiment is capable of sensing the rotation of the substrate 1250 around the axis parallel to the substrate 1250 and is commonly known as X- or Y-axis angular rate sensor, and the second embodiment is capable of sensing the rotation of the substrate 1250 around the axis normal to the substrate 1250 and is commonly known as Z axis angular rate sensor.

In addition, a mass-translation terminology is disclosed herein. However, the analysis is not limited to mass-translation only but is equally valid for moment-of-inertia-rotation terminology, as well as for the combination thereof.

Sensing System

Figure 1B:
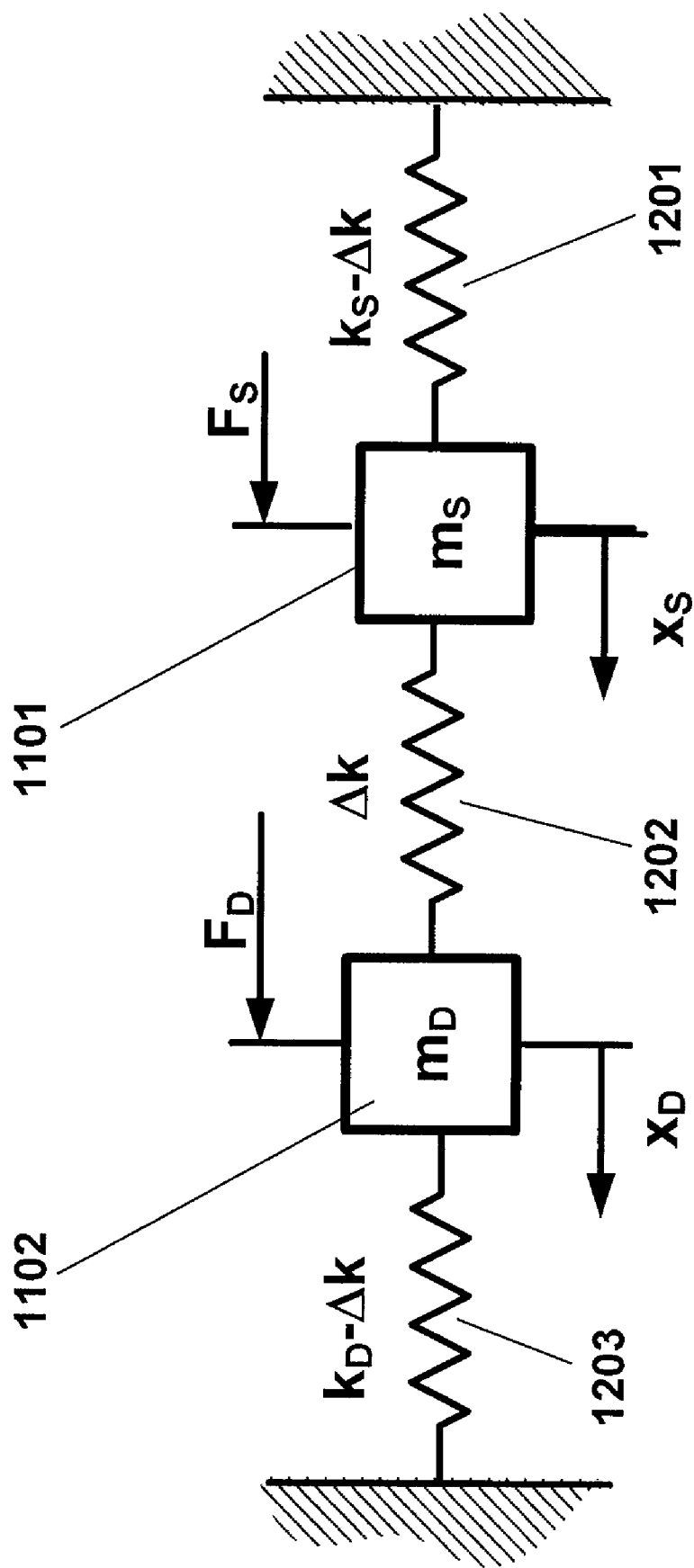
FIG. 1B depicts the disclosed sensing method comprising flexibly-coupled drive and sense subsystems.
Figure 1C:
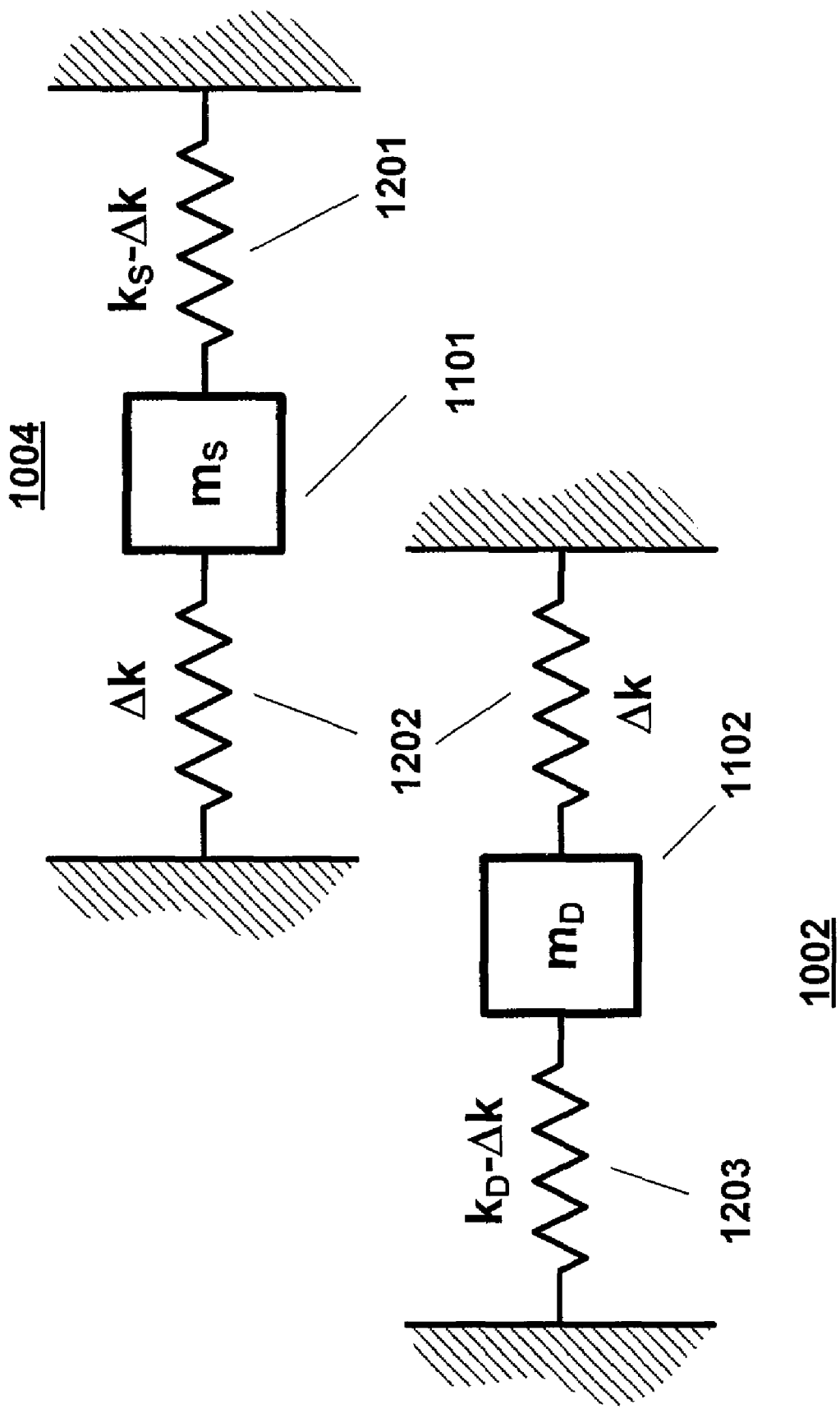
FIG. 1C depicts uncoupled drive and sense subsystems characterized by an uncoupled drive and an uncoupled sense resonant modes, respectively.

FIG. 1B depicts the disclosed sensing method comprising flexibly-coupled drive and sense subsystems 1002 and 1004, while FIG. 1C depicts uncoupled sense subsystem 1004 characterized by a sense resonant mode having frequency $\omega_S=\sqrt{(k_S/m_S)}$, and uncoupled drive subsystem 1002 characterized by a drive resonant mode having frequency $\omega_D=\sqrt{(k_D/m_D)}$. The sense subsystem 1004 comprises mass $m_S$ 1101, a sense spring 1201 with stiffness $k_S-\Delta k$, and a coupling spring with stiffness $\Delta k$ 1202. The drive subsystem comprises mass $m_D$ 1102, a drive spring 1203 with stiffness $k_D-\Delta k$, and a coupling spring with stiffness $\Delta k$. The sense mass $m_S$ 1101 is suspended from the substrate by the sense spring 1201 while the drive mass $m_D$ 1102 is suspended from the substrate by the drive spring 1203. Referring to FIG. 1B, the sense mass $m_S$ 1101 and the drive mass $m_D$ 1102 are flexibly coupled through a spring 1202 with stiffness $\Delta k$ such that both stiffness $k_S-\Delta k$ and stiffness $k_D-\Delta k$ are greater than zero, i.e. $k_S-\Delta k>0$ and $k_D-\Delta k>0$. The sensing system from FIG. 1B yields a total of four transfer functions whose inputs are generalized forces $F_S$ and $F_D$ and outputs are motion of the particular mass, $x_S$ or $x_D$.

The relationship between the position of the sense mass $x_S$ 1101, $x_S$, and force acting on the drive mass 1102, $F_D$, can be expressed as the following transfer function:

$$G_{DS}(s) = \frac{x_S(s)}{F_D(s)} = \frac{1}{m_D m_S} \frac{\Delta k}{(s^2 + \omega_{S1}^2)(s^2 + \omega_{S2}^2)}$$

where $\omega_{S1}$ and $\omega_{S2}$ are modal frequencies assigned to two vibratory modes of the system from FIG. 1B. Similarly, the relationship between the position of the drive mass 1102, $x_d$, and force acting on the sense mass 1101, $F_S$, can be expressed as a yet another transfer function:

$$G_{SD}(s) = \frac{x_D(s)}{F_S(s)} = \frac{1}{m_D m_S} \frac{\Delta k}{(s^2 + \omega_{S1}^2)(s^2 + \omega_{S2}^2)}$$

Further, the relationship between the position of, and the force acting on either drive mass $m_D$ 1102 or sense mass $m_S$ 1101 can be expressed with the following transfer functions:

$$G_{SS}(s) = \frac{x_S(s)}{F_S(s)} = \frac{1}{m_S} \frac{(s^2 + \omega_D^2)}{(s^2 + \omega_{S1}^2)(s^2 + \omega_{S2}^2)}$$

$$G_{DD}(s) = \frac{x_D(s)}{F_D(s)} = \frac{1}{m_D} \frac{(s^2 + \omega_S^2)}{(s^2 + \omega_{S1}^2)(s^2 + \omega_{S2}^2)}$$

where $G_{DD}$ has an anti-resonance $\omega_S$, defined as a sense resonant mode of the uncoupled sense subsystem and $G_{SS}$ has anti-resonance $\omega_D$, defined as a drive resonant mode of the uncoupled drive subsystem.

Figure 2A:
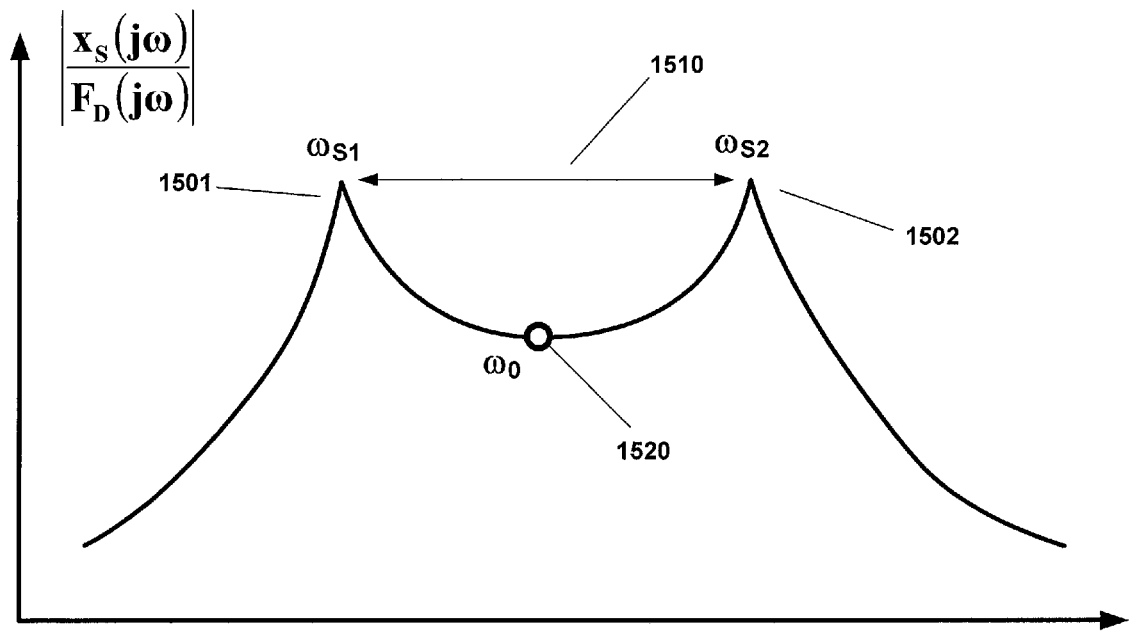
FIG. 2A shows an amplitude-frequency characteristic of transfer functions $G_{SD}$ and $G_{DS}$.
Figure 2B:
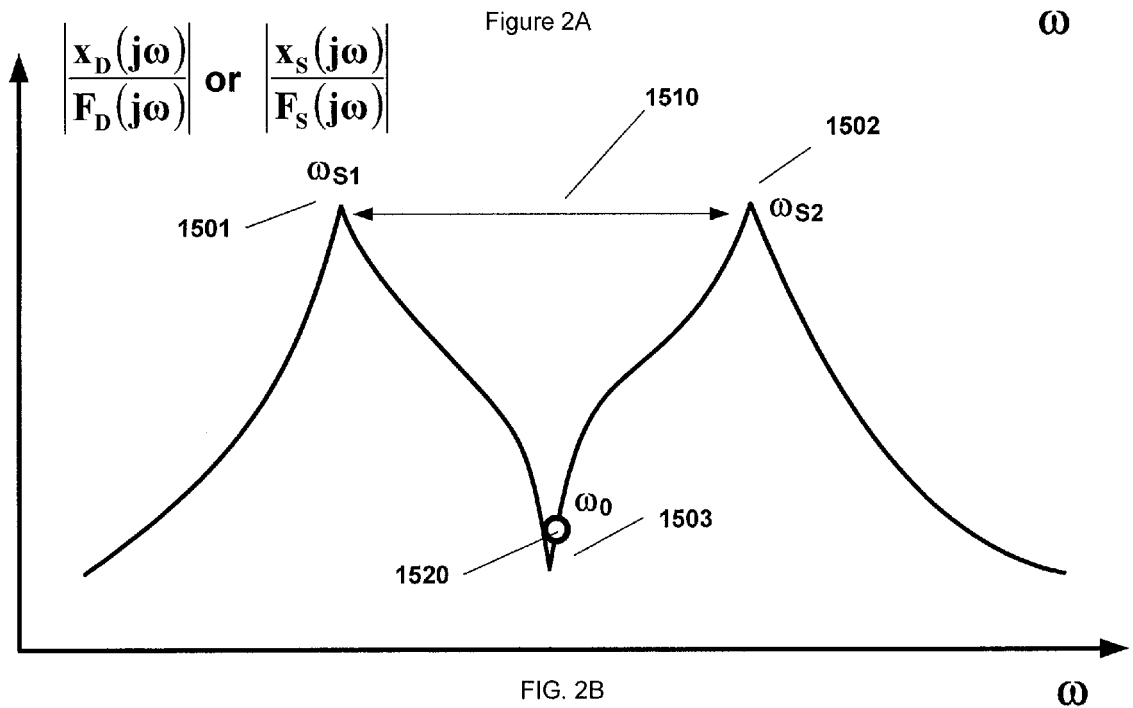
FIG. 2B shows an amplitude frequency characteristic of transfer functions $G_{SS}$ and $G_{DD}$.

An amplitude-frequency characteristic of transfer functions $G_{SD}$ and $G_{DS}$ is shown in FIG. 2A, and amplitude frequency characteristic of transfer functions $G_{SS}$ and $G_{DD}$ is shown in FIG. 2B. In both FIG. 2A and FIG. 2B resonant peak 1501 is defined by resonant frequency $\omega_{S1}$ and peak 1502 is defined by resonant frequency $\omega_{S2}$. The difference between $\omega_{S2}$ and $\omega_{S1}$ is shown in FIG. 2A as 1510. Anti-resonance 1503 in FIG. 2b is defined either by $\omega_S$ or $\omega_D$, depending whether transfer function $G_{DD}$ or $G_{SS}$ is considered. Further, the drive mass 1102 may be oscillated at frequency $\omega_0$ such that drive force $F_D$ acting on the drive mass 1102 may be Coriolis force or torque. Also, position $x_S$ may be measured and its amplitude may be proportional to the rate of rotation of the substrate 1250. Also, force $F_S$ may act on sense mass 1101, and force $F_S$ may be induced by the mechanical noise such as Brownian motion. As frequency $\omega$ is the frequency at which the Coriolis force modulates onto the mass 1102 the sensitivity of the sensor is proportional to the gain of the amplitude frequency characteristics at frequency $\omega_0$ (1520), as shown in FIG. 2A.

It is desirable to design $\omega_S=\omega_D=\omega_0$, to reduce noise and increase sensitivity. Effectively, if frequency $\omega_0$ equals $\omega_S$, the Coriolis force acting on the drive mass 1102 generates motion at $x_S$ without moving $x_D$ at all. Drive mass 1102 only transfers force to sense mass 1101. Consequently, energy of oscillations caused by the Coriolis force is not used to oscillate drive mass 1102 but is all used to oscillate sense mass 1101. This improves sensitivity. In the other words, the sense subsystem 1004 acts as a vibration absorber for the drive system 1002 at the frequency of drive oscillations. Further, referring to FIG. 1B and FIG. 2B, if force $F_S$ is caused by Brownian noise, the spectrum of noise at $x_S$ is shaped by amplitude-frequency characteristic shown in FIG. 2B. If frequency of the anti-resonance $\omega_D$ is substantially equal to the oscillation frequency $\omega_0$, the Brownian noise will not cause motion $x_S$ at frequencies substantially closed to anti-resonance $\omega_D$ 1503. In the other words, the drive subsystem 1002 acts as a vibration absorber for the sense system 1004 at the frequency of drive oscillations, therefore rejecting the noise-induced motion of the sense subsystem 1004.

Both anti-resonant frequencies, $\omega_S$ and $\omega_D$, may be made substantially equal to the frequency of drive oscillations $\omega_0$ by adjusting stiffness of the sense 1004 and the drive 1002 system's springs, $k_S$ and $k_D$. If $\omega_S$ and $\omega_D$ are substantially equal to $\omega_0$, frequencies $\omega_{S1}$ and $\omega_{S2}$ may be calculated as:

$$\omega_{S1}^2 = \omega_0^2 \left(1 - \frac{\Delta k}{\sqrt{k_D k_S}}\right)$$

$$\omega_{S2}^2 = \omega_0^2 \left(1 + \frac{\Delta k}{\sqrt{k_D k_S}}\right)$$

The flexible coupling $\Delta k$ 1202 defines separation between $\omega_{S2}$ and $\omega_{S1}$ 1510. Coupling stiffness $\Delta k$ 1202 may be substantially large in order to separate peaks, yielding wider sensor bandwidth. On the other hand, coupling stiffness $\Delta k$ 1202 may be substantially small to keep peaks close enough in order to achieve high transducer gain. In all, three tunable design parameters, $k_S$, $k_D$, and $\Delta k$, are available to independently adjust two anti-resonances, $\omega_S$ and $\omega_D$, as well as separation between resonant frequencies $\omega_{S2}$ and $\omega_{S1}$, therefore providing high design flexibility in terms of choice of operational frequency $\omega_0$, sensitivity and bandwidth.

Figure 3:
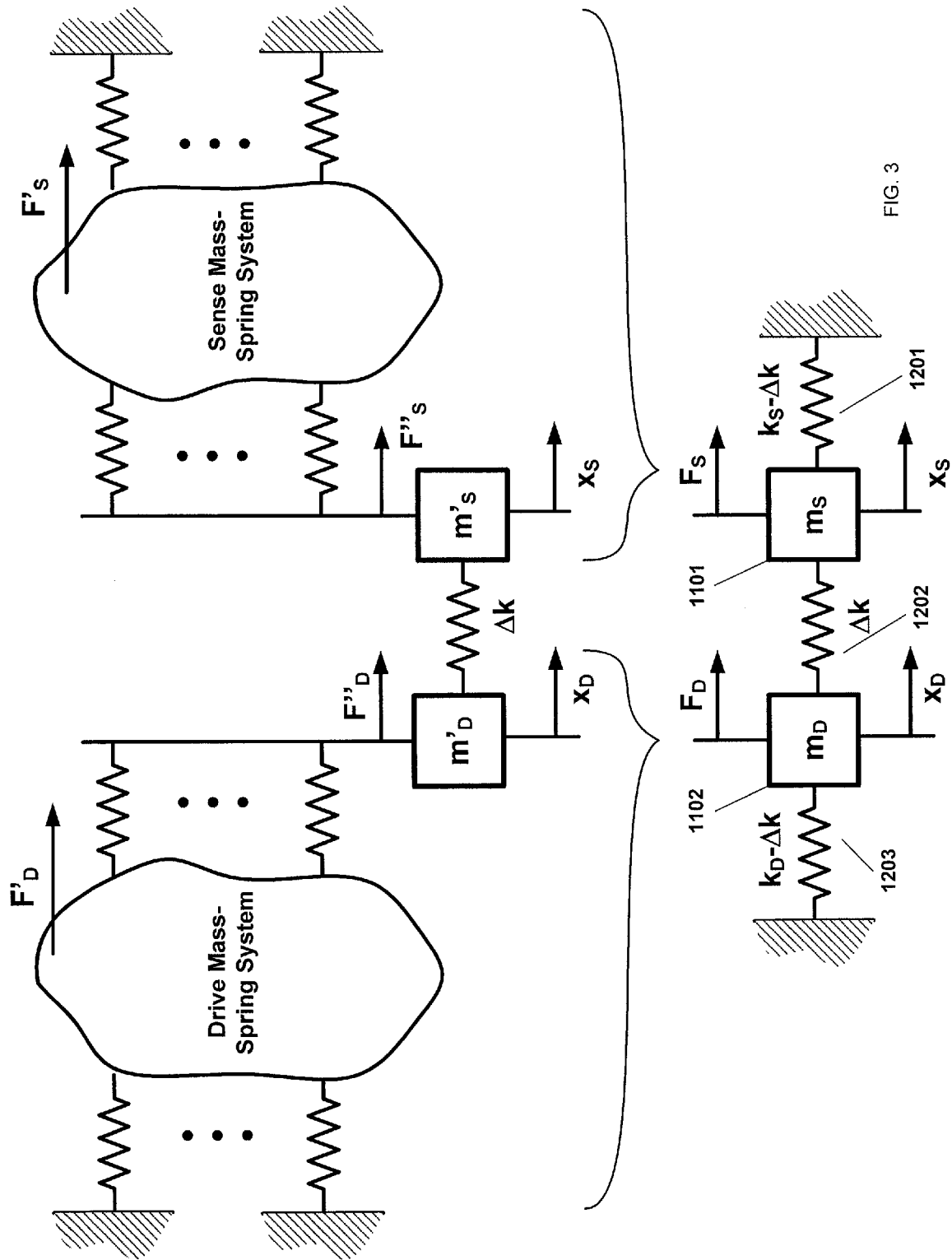
FIG. 3 shows drive and sense subsystems comprising complex mass-spring systems and reduction of such complex system into a simple two mass sense system.

In one implementation, referring to FIG. 3, the drive subsystem 1002 may comprise a plurality of masses, a plurality of springs and a plurality of anchors and the sense subsystem 1004 may comprise a plurality of masses, a plurality of springs and a plurality of anchors. Consequently, the uncoupled drive subsystem 1002 may have a plurality of vibratory modes and the uncoupled sense subsystem 1004 may have a plurality of vibratory modes. One of the vibratory modes of the uncoupled sense subsystem 1004 may have resonant frequency $\omega_S$ and one of the vibratory modes of uncoupled drive subsystem may have resonant frequency $\omega_D$, and both $\omega_S$ and $\omega_D$ may be substantially close to $\omega_0$. Further, when coupled, the system has at least two resonant modes with frequencies $\omega_{S2}$ and $\omega_{S1}$.

The drive subsystem 1002 may have at least one mass, $m'_D$, flexibly coupled to the sense subsystem 1004 and the sense subsystem 1004 may have at least one mass, $m'_S$, flexibly coupled to the drive subsystem 1002. Further, as shown in FIG. 3, it is possible to model the drive system 1002 and forces acting upon it with a single mass 1102, a single spring 1203, a single anchor and a single force acting on the mass 1102. Similarly sense system 1004 and forces acting upon it can be modeled with a single mass 1101, a single spring 1201, a single anchor and a single force acting on the mass 1101. The coupled sensing system from FIG. 3 can be represented with the simple two-mass, three-spring system such that the uncoupled drive frequency, $\omega_D$, uncoupled sense frequency, $\omega_S$, and frequencies of the coupled system, $\omega_{S2}$ and $\omega_{S1}$, are the same.

Figure 4A:
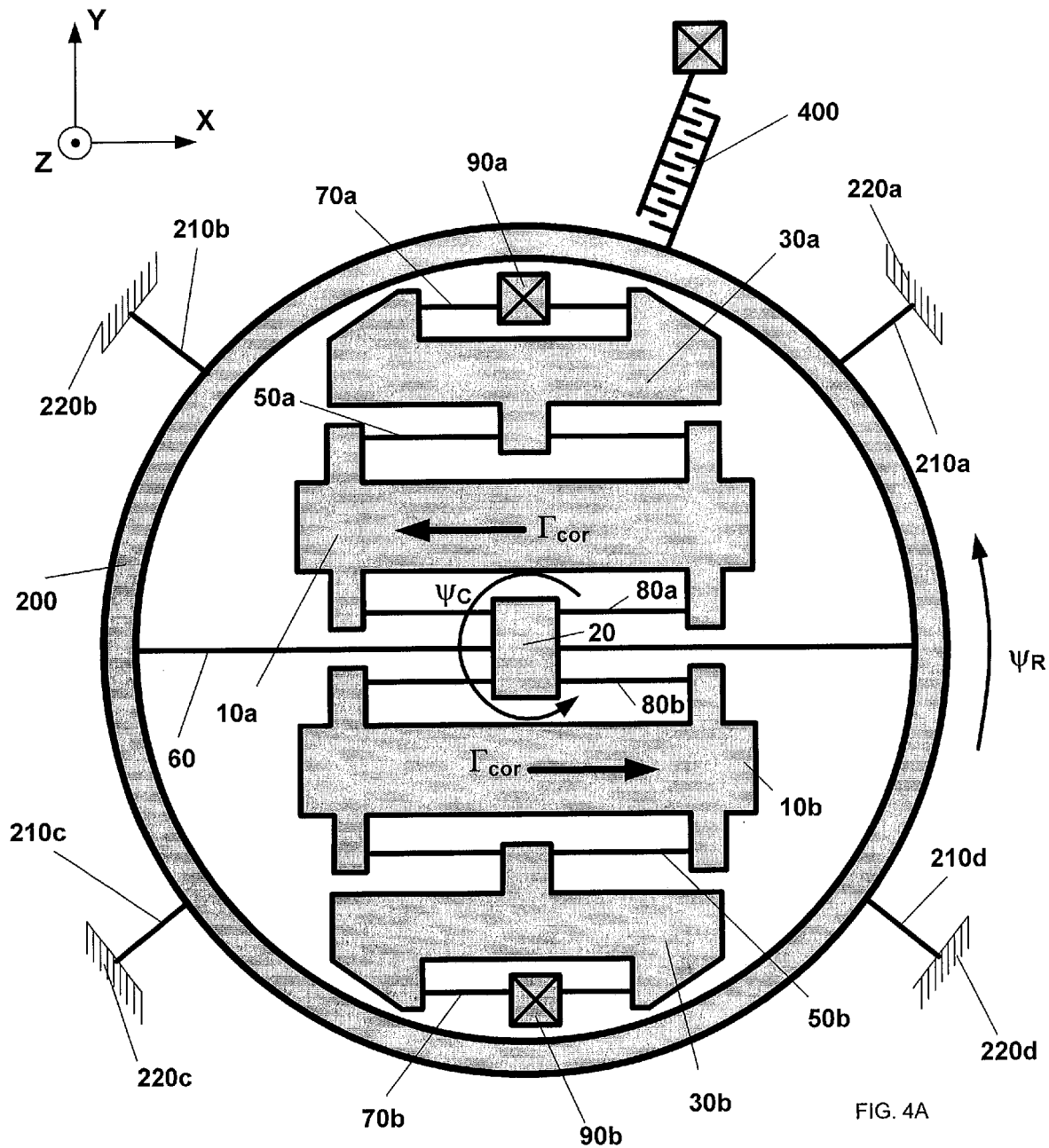
FIG. 4A, shows one implementation in accordance with the present invention.
Figure 4B:
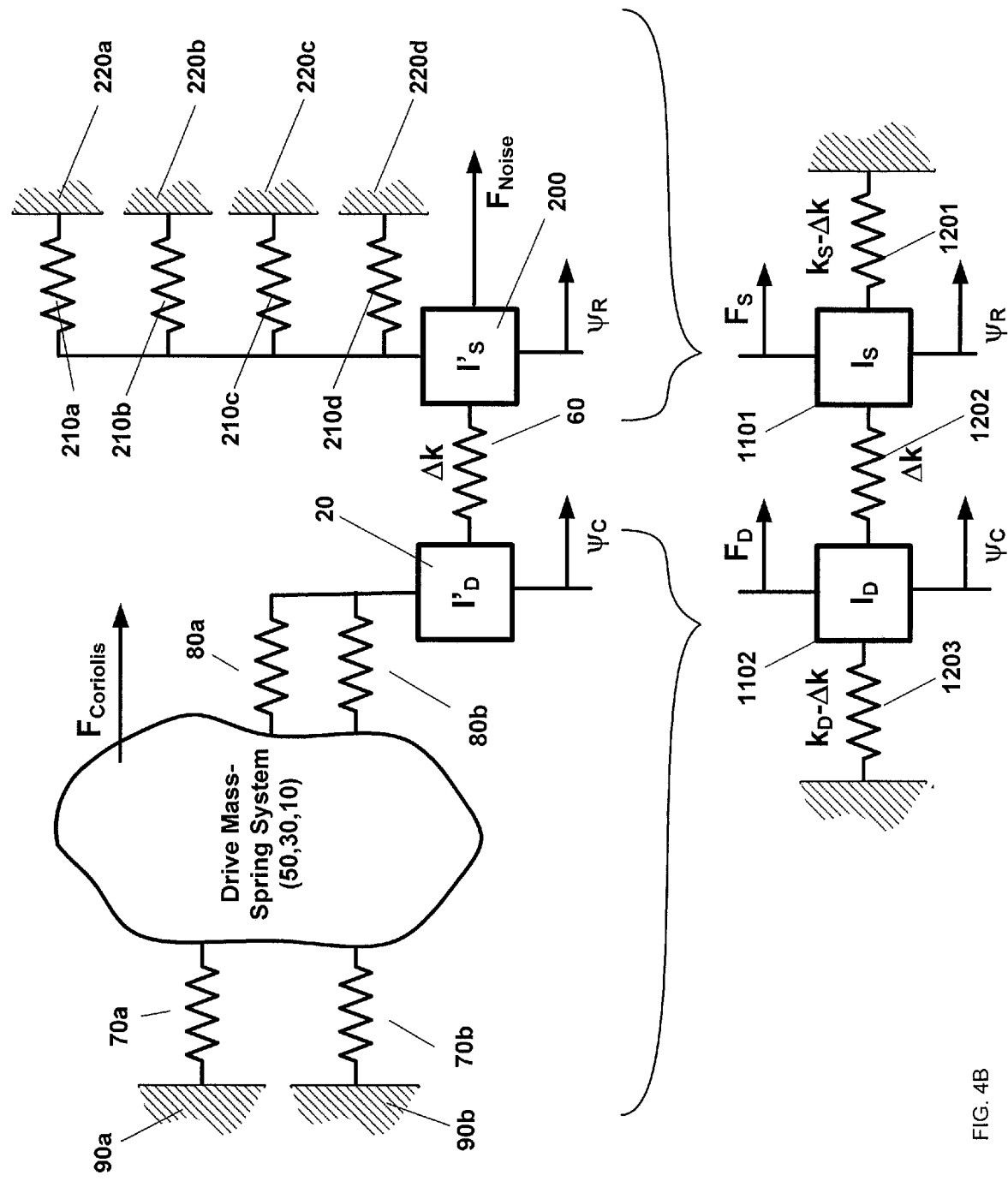
FIG. 4B shows reduction of the embodiment from FIG. 4A into the two mass system.

In one implementation, drive and sense subsystems may be formed within the device layer which is parallel to the substrate and a plane. Referring to FIG. 4a, the drive subsystem comprises masses 10a, 10b, 20, 30a and 30b and spring systems 50, 70 and 80. The drive system is supported by the substrate at anchoring points 90a and 90b and spring systems 70a and 70b. The sense subsystem comprises single mass 200 and plurality of springs 210a-d suspending the sense subsystem to the substrate through the anchoring points 220a-d. The drive and the sense subsystems are flexibly coupled through spring system 60. Referring to FIG. 4b, and according to teaching related to FIG. 3, the drive subsystem may be lumped such that the rotation of the mass 20, $\psi_C$, represents total motion of the drive subsystem around the Z axis. The sense subsystem may be lumped such that the rotation of the mass 200, $\psi_R$, represents total motion of the sense subsystem round the Z axis. The whole system reduces to the simple, flexible-coupled, two-mass system already analyzed and related to FIG. 1B.

In one implementation, proof masses 10a and 10b may be oscillated at frequency $\omega_0$ in anti-phase fashion along the Z-axis. If the substrate rotates around the Y axis, the Coriolis force acts on proof masses 10a and 10b along the X axis in opposite direction therefore generating torque around the Z-axis. Generated torque is transferred to inertia 20 and to the sense subsystem's mass 200 through spring system 60 causing rotation of the sense mass with amplitude proportional to the input rate of rotation around Y axis, Rotation of the sense subsystem may be sensed by appropriate transducer 400.

In yet another implementation, the proof masses 10a and 10b may be oscillated at frequency $\omega_0$ along Y-axis in anti-phase fashion. If the substrate rotates around the Z axis, the Coriolis force acts on proof masses 10a and 10b along the X axis in opposite direction therefore generating torque around the Z-axis. Generated torque is transferred to mass 20 and further to the mass 200 through spring system 60 causing rotation of the sense subsystem with amplitude proportional to the input rate of rotation around Z-axis. Rotation of the sense subsystem may be sensed by appropriate transducer 400.

Figure 5:
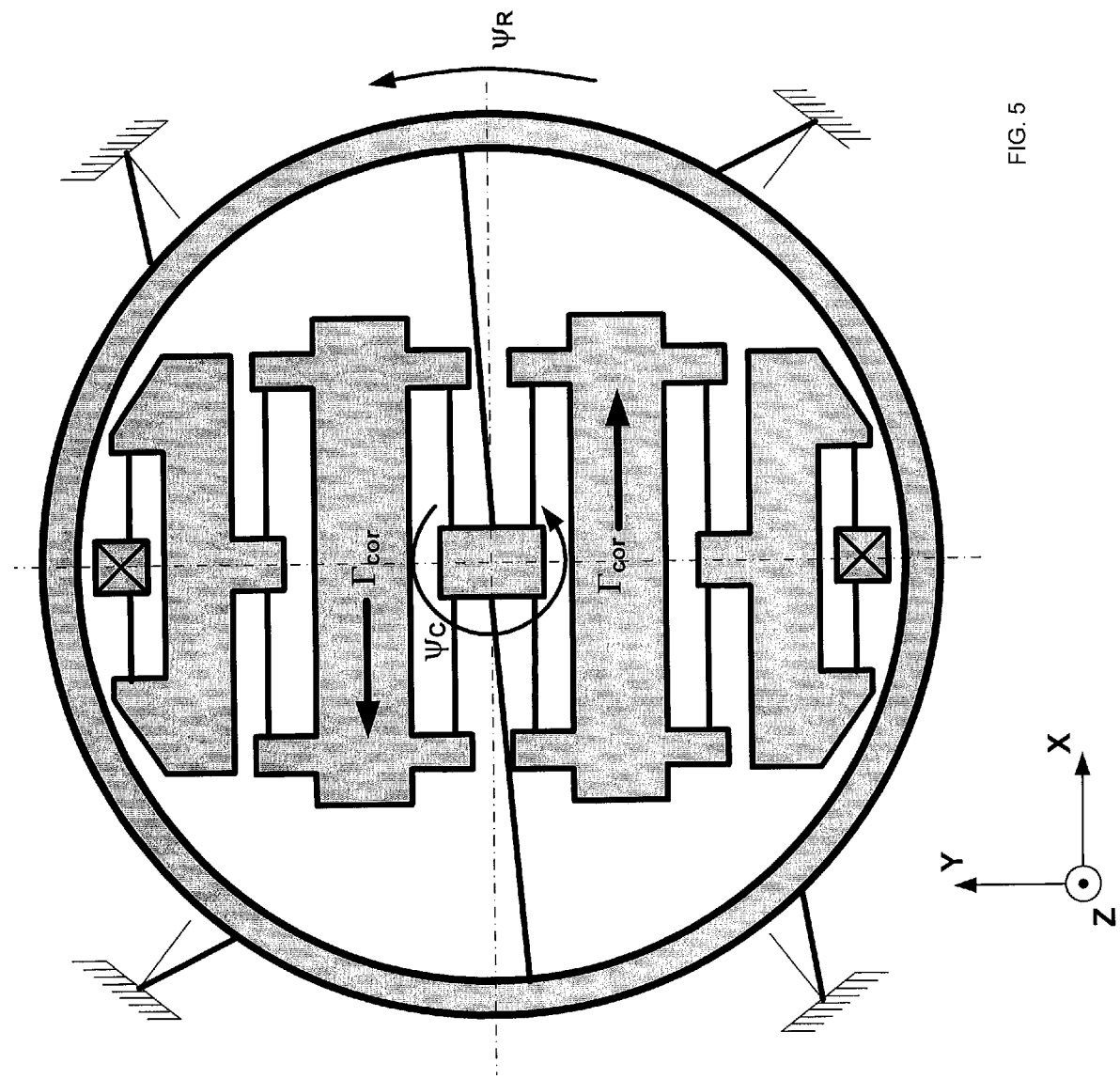
FIG. 5 shows a mechanism of transfer of Coriolis force to the sense mass, i.e., torque acting on drive system cause only sense system to rotate.

Referring to FIG. 5, a mechanism of transfer of Coriolis force to the sense mass, i.e. ring, is shown in greater detail. As the sense subsystem acts as a vibration absorber for the drive subsystem, the Coriolis force generated at drive system is only transferred through the drive system to the sense subsystem. The drive subsystem does not move while the sense subsystem rotates. This way, Coriolis force is used only to rotate the sense subsystem therefore improving sensitivity of the sensor. Further, as the drive subsystem acts as the vibration absorber for the sense subsystem, any torque generated on the sense subsystem, such as Brownian noise, moves only the drive subsystem. Therefore, the noise acting on the sense subsystem is reduced significantly.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An angular rate sensor comprising
    a substrate;
    a drive subsystem partially supported by the substrate with at least one spring, at least one anchor; and at least one mass; wherein the at least one mass of the drive subsystem is oscillated by at least one actuator along a first axis; and Coriolis force acting on the drive subsystem along a second axis in response to angular velocity of the substrate around a third axis;
    a sense subsystem partially supported by the substrate with at least one spring, at least one anchor; and at least one mass; wherein the sense subsystem moves along or around a fourth axis; and motion of the sense subsystem can be sensed by a transducer and is proportional to the angular velocity of the substrate about the third axis; and
    at least one flexible coupling between the drive subsystem and the sense subsystem, wherein the flexible coupling couples a drive subsystem motion in the second axis to the sense subsystem motion about the fourth axis, wherein the flexible coupling causes two resonant modes allowing both in-phase and anti-phase motion between the sensor subsystem and the drive subsystem.

2. The angular rate sensor of claim 1, wherein the drive subsystem, the sense subsystem and the flexible coupling form a mechanical system with at least two resonant modes, at least one drive subsystem anti-resonance and a least one sense subsystem anti-resonance.

3. The angular rate sensor of claim 2, wherein a frequency of drive oscillations along the first axis substantially matches drive anti-resonance frequency; and a frequency of drive oscillations along the first axis substantially matches sense anti-resonance frequency.

4. The angular rate sensor of claim 1, where the drive subsystem comprises plurality of masses; and plurality of springs; wherein the at least one mass from the drive subsystem is flexibly coupled to the at least one mass from the sense subsystem.

5. The angular rate sensor of claim 1, where the sense subsystem comprises a plurality of masses; and comprises plurality of springs; wherein the at least one mass from the sense subsystem is flexibly coupled to the at least one mass from the drive subsystem.

6. The angular rate sensor of claim 1 comprising wherein the drive subsystem oscillates normal to a plane parallel to the substrate; and the sense subsystem moves around an axis normal to the plane; the sense subsystem responding to angular velocity along an axis parallel to the plane.

7. The angular rate sensor of claim 1 comprising wherein the drive subsystem oscillates in a plane parallel to the substrate; and the sense subsystem moving around an axis normal to the plane; the sense subsystem responding to angular velocity along an axis normal to the plane.

* * * * *